(12) United States Patent
Matsuo

(10) Patent No.: US 6,523,915 B1
(45) Date of Patent: Feb. 25, 2003

(54) ELASTIC ENDLESS CRAWLER

(75) Inventor: Shuichi Matsuo, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/787,007

(22) PCT Filed: Jul. 14, 2000

(86) PCT No.: PCT/JP00/04740

§ 371 (c)(1),
(2), (4) Date: Mar. 12, 2001

(87) PCT Pub. No.: WO01/05644

PCT Pub. Date: Jan. 25, 2001

(30) Foreign Application Priority Data

Jul. 14, 1999 (JP) ............................. 11-199807

(51) Int. Cl.[7] .............................................. B62D 55/24
(52) U.S. Cl. ...................................... 305/167; 305/170
(58) Field of Search ................................ 305/157, 165, 305/167, 170

(56) References Cited

U.S. PATENT DOCUMENTS

| | | | | |
|---|---|---|---|---|
| 1,612,024 A | * | 12/1926 | Jacobs | 305/170 |
| 2,290,109 A | * | 7/1942 | Mayne | 305/170 |
| 2,318,347 A | * | 5/1943 | Mayne | 305/170 |
| 2,378,427 A | * | 6/1945 | Myers | 305/170 |
| 3,144,930 A | * | 8/1964 | Michels | 305/170 |
| 3,602,364 A | * | 8/1971 | Maglio | 305/170 |

FOREIGN PATENT DOCUMENTS

| | | | | |
|---|---|---|---|---|
| DE | 43 40 159 A1 | | 6/1995 | |
| GB | 2152885 A | * | 8/1985 | 305/170 |
| JP | 354003737 A | * | 1/1979 | 305/170 |
| JP | A-3-295776 | | 12/1991 | |
| JP | A-10-157664 | | 6/1998 | |

* cited by examiner

*Primary Examiner*—S. Joseph Morano
*Assistant Examiner*—Long Bao Nguyen
(74) *Attorney, Agent, or Firm*—Oliff & Berridge, PLC

(57) ABSTRACT

In the present invention, cord protruding portions at each of ends of a crawler body are divided into groups such that each group has a protruding length different from those of other groups. The entire cord protruding portions at one end of the crawler body when seen from a direction perpendicular to a belt surface are disposed so as to present a male configuration, and the entire cord protruding portions at the other end of the crawler body are disposed so as to present a female configuration. The lines each connecting ends of cord protruding portions at the ends of the crawler body can be disposed so as to form a configuration that is one of terraced, tiered, and crenellated when seen from a direction perpendicular to a belt surface. When seen from the direction perpendicular to the belt surface, an overlapping portion of steel cords includes two outlines separated from each other in a longitudinal direction of the belt, and each outline includes a bent line. According to the present invention, a difference in rigidity between a portion of the crawler body including the overlapping portion of steel cords, and a portion not including the overlapping portion can be lessened as far as possible. Therefore, occurrence of vibration or noise can be effectively prevented. Further, a boundary between a high rigidity portion and a nonrigid portion of the rubber crawler is formed characteristically. As a result, occurrence of bending or buckling of the rubber crawler is alleviated, and the rubber crawler having excellent durability and reliability can be provided.

20 Claims, 6 Drawing Sheets ed with reference to FIGS. 1 to 4.
ELASTIC ENDLESS CRAWLER

FIELD OF THE INVENTION

The present invention relates to a ring-shaped elastic endless crawler which comprises an elongated belt-shaped elastic crawler body, and a plurality of cords disposed in array and embedded in the crawler body so as to extend in a longitudinal direction of the crawler body, in which each of cord protruding portions projecting out from one end of the crawler body, and a corresponding cord protruding portion projecting out from another end of the crawler body are made to overlap each other and the cord protruding portions are entirely subjected to vulcanization processing to thereby form an integrally connected structure.

BACKGROUND ART

A conventional rubber crawler 1 will be hereinafter described with reference to FIGS. 1 to 4.

In a manufacturing process of the rubber crawler 1, first, as illustrated in FIG. 3, a semi-manufactured product is formed in which steel cords 3 are made to project out from each of one end 1a of a crawler body and another end 1b of the crawler body by the same length.

Next, as illustrated in FIG. 4, each of cord protruding portions 3a at the one end 1a of the crawler body, and a corresponding cord protruding portion 3b at the another end 1b of the crawler body are disposed so as to overlap each other. Lines AO—AO, and BO—BO each connecting opposite ends of cord protruding portions, are arranged in parallel in a transverse direction of a belt and extend transversely of an entire width of the belt. For the purpose of facilitating understanding, in FIG. 4, a portion in which cord protruding portions overlap each other is indicated exaggeratively by a thick line.

Due to the cord protruding portions 3a and 3b being entirely subjected to vulcanization processing (heating and filling unvulcanized rubber), an integrated rubber crawler as shown in FIGS. 1 and 2 is completed.

However, the rigidity of the rubber crawler 1 depends on the steel cords 3, and a portion of the crawler body including a region in which steel cords 3 overlap each other, necessarily becomes higher in rigidity (becomes very hard) than a portion of the crawler body not including the region in which the steel cords 3 overlap each other.

Accordingly, when the rubber crawler 1 is used in a state of being fitted around a sprocket or an idler (which are not shown), a state is caused in which a hard portion and a non-hard portion of the rubber crawler 1 are intermittently engaged with each other. As a result, vibration or noise may be unavoidably generated.

Further, the lines AO—AO and BO—BO which form the boundary between a high-rigidity (hard) portion and a nonrigid portion of the rubber crawler 1 are straight lines each extend transversely of an entire width of the crawler body (that is, the belt). Therefore, the rubber crawler 1 is easy to considerably bend with the lines AO—AO and BO—BO substantially as the center.

DISCLOSURE OF THE INVENTION

One object of the present invention is to provide a structure by which a difference in rigidity between a portion of a crawler body including a region in which steel cords overlap each other, and a portion of the crawler body not including the region, can be reduced as far as possible, thereby preventing generation of vibration or noise.

Further, another object of the present invention is to provide a rubber crawler having excellent durability and reliability, in which a boundary between a high-rigidity portion and a nonrigid portion of the rubber crawler is formed characteristically to alleviate occurrence of bending or buckling of the rubber crawler.

In order to solve the above-described problems, an elastic endless crawler of the present invention is a ring-shaped elastic endless crawler which comprises an elongated belt-shaped elastic crawler body, and a plurality of cords disposed in array and embedded in the crawler body so as to extend in a longitudinal direction of the crawler body, in which each of cord protruding portions projecting out from one end of the crawler body and a corresponding cord protruding portion projecting out from the other end of the crawler body are made to overlap each other, and thereafter, are entirely subjected to vulcanization processing to thereby form an integrally connected structure, the elastic endless crawler being characterized in that cord protruding portions at each of the ends of the crawler body are divided into groups such that each group has a protruding length different from those of other groups.

Another elastic endless crawler according to the present invention is characterized in that the entire cord protruding portions at the one end of the crawler body when seen from a direction perpendicular to a belt surface, are formed so as to present a male configuration, and the entire cord protruding portions at the other end of the crawler body are formed so as to present a female configuration.

Still another elastic endless crawler according to the present invention is characterized in that lines each connecting ends of facing cord protruding portions at the ends of the crawler body are disposed so as to have a configuration that is one of terraced, tiered, and crenellated when seen from a direction perpendicular to a belt surface.

A further elastic endless crawler according to the present invention is characterized in that when seen from a direction perpendicular to a belt surface, a portion in which cord protruding portions overlap each other, includes two outlines separated from each other in a longitudinal direction of a belt, and each outline includes a bent line.

BEST MODES FOR CARRYING OUT THE INVENTION

Referring now to the attached drawings, the present invention will be hereinafter described in conjunction with a plurality of embodiments. It should be understood that the present invention should not be limited to the embodiments. For example, a rubber crawler according to these embodiments is a so-called internal driving type rubber crawler, but the present invention is not limited to the same.

First, a first embodiment of the present invention will be described with reference to FIGS. 5 to 8.

Figure 1:
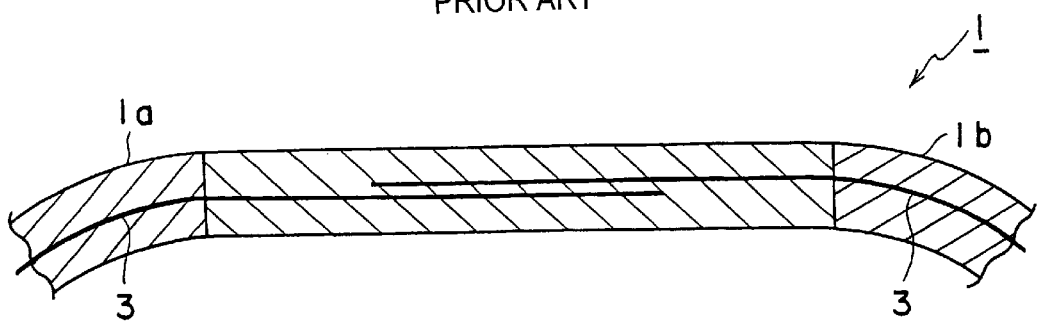
FIG. 1 is a cross-sectional side view which shows a connecting portion in a conventional rubber crawler.
Figure 2:
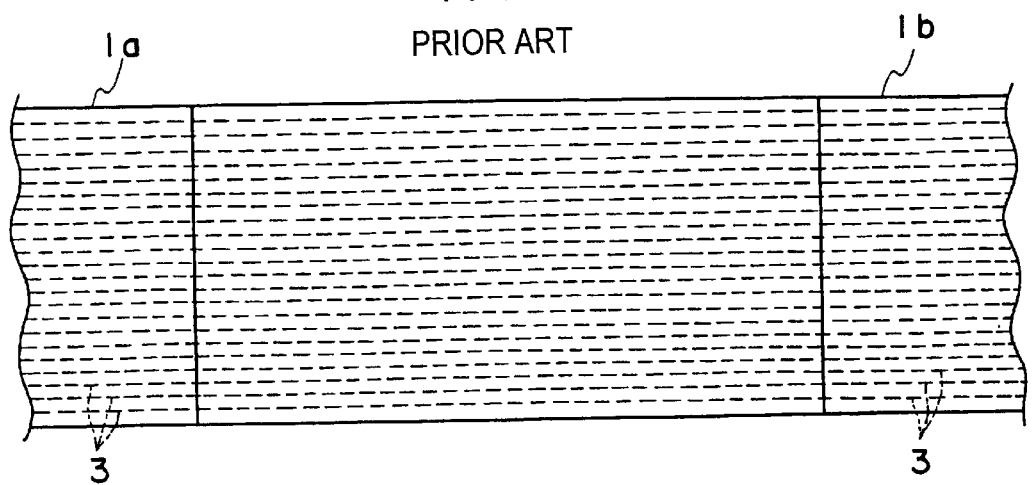
FIG. 2 is a plan view of the rubber crawler shown in FIG. 1.
Figure 3:
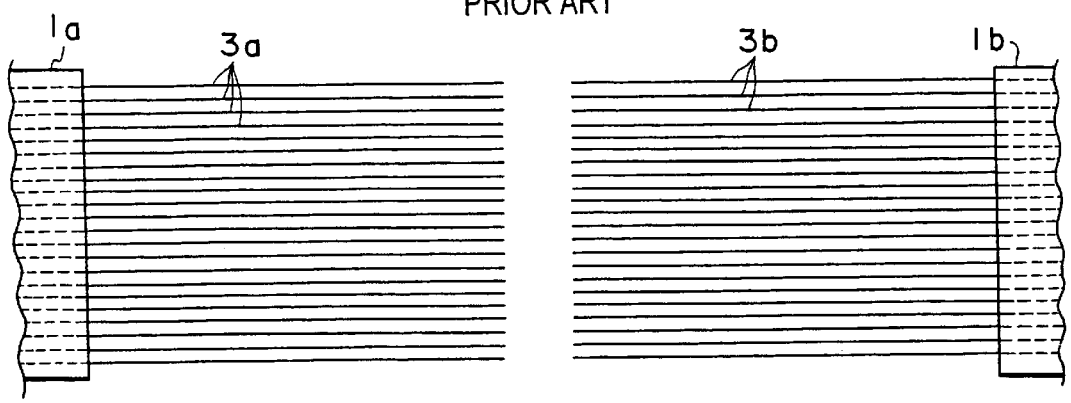
FIG. 3 is a plan view which shows cord protruding portions at each of ends of a crawler body in a connecting process of the rubber crawler shown in FIG. 1.
Figure 4:
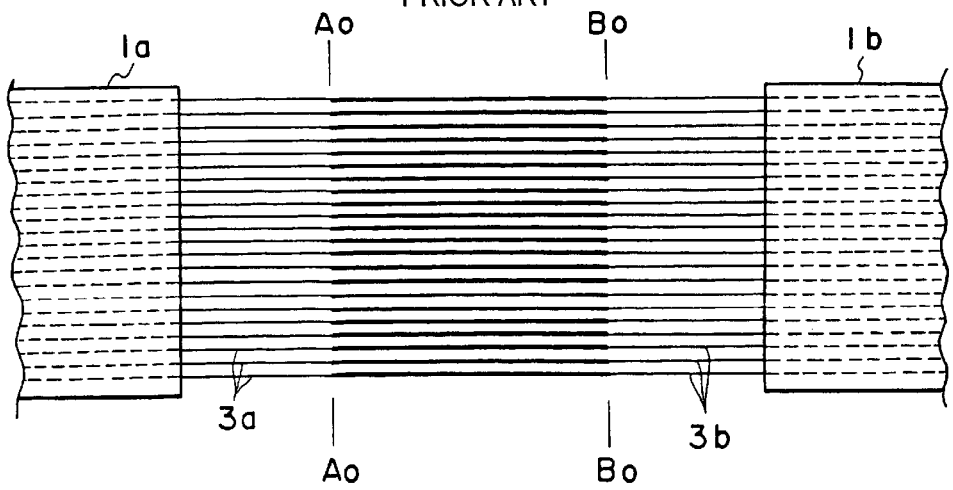
FIG. 4 is a plan view which shows a state in which each of the cord protruding portions shown in FIG. 3 and a corresponding cord protruding portion are made to overlap each other.
Figure 5:
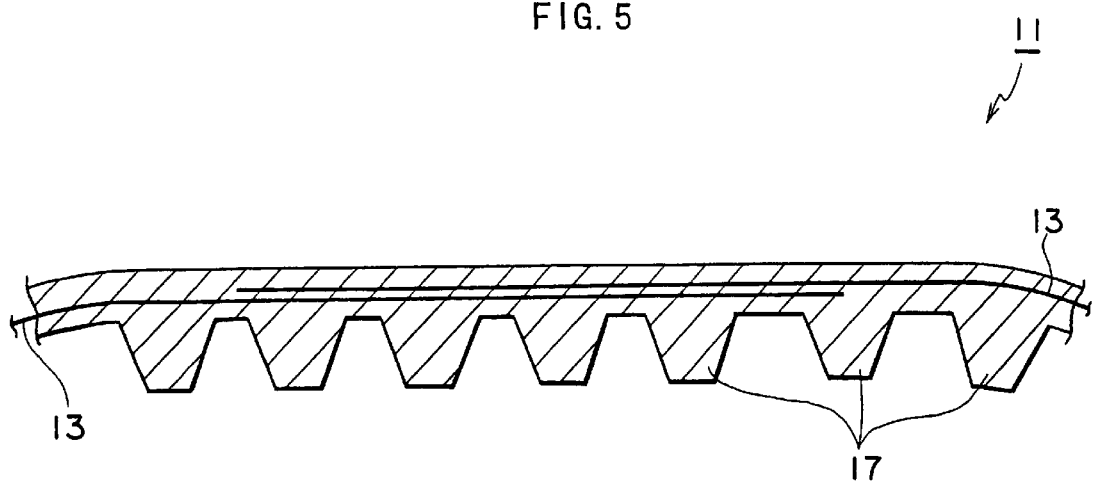
FIG. 5 is a cross-sectional side view which shows a connecting portion in a rubber crawler according to a first embodiment of the present invention.
Figure 6:
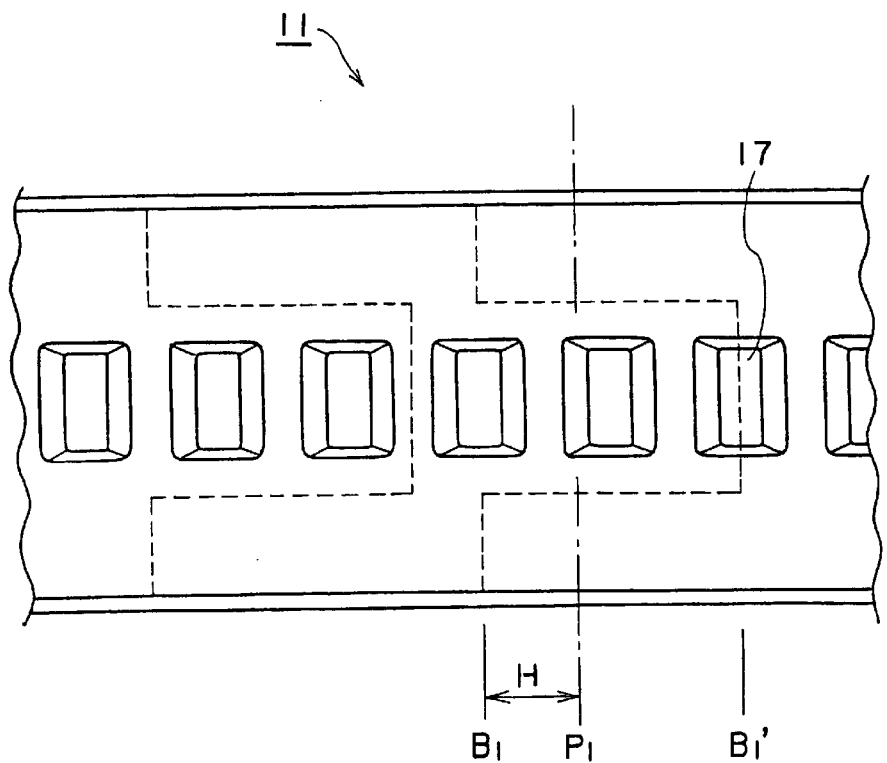
FIG. 6 is a plan view of the rubber crawler shown in FIG. 5.

As shown in FIGS. 5 and 6, the rubber crawler 11 of the first embodiment includes an elongated belt-shaped elastic crawler body, and a plurality of cords 13 made of, for example, steel, which are disposed in array and embedded in the crawler body so as to extend in a longitudinal direction of the crawler body. A plurality of protrusions 17 for driving the rubber crawler are formed at an underside of the rubber crawler (belt), that is, on an inner peripheral surface of the crawler.

Figure 7:
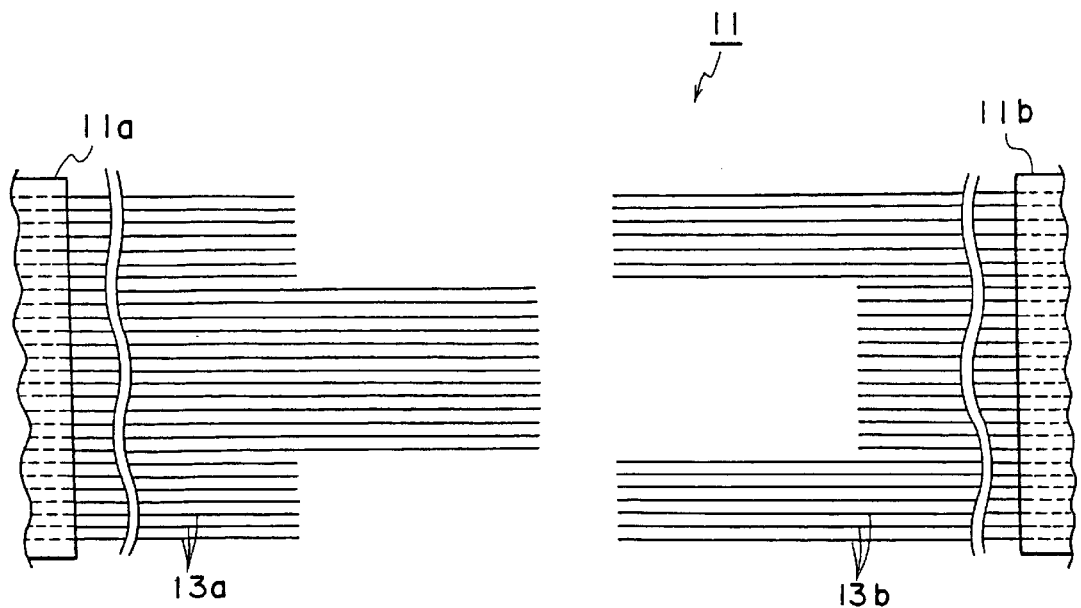
FIG. 7 is a plan view which shows cord protruding portions at each of ends of a crawler body in a connecting process of the rubber crawler shown in FIG. 5.

As shown in FIG. 7, in a rubber crawler manufacturing process (in a connecting process), a semi-manufactured product is prepared in which cords 13 (13a and 13b) are respectively made to project out from one end 11a of the crawler body and the other end 11b of the crawler body, and the cords are disposed so as to face each other.

Figure 8:
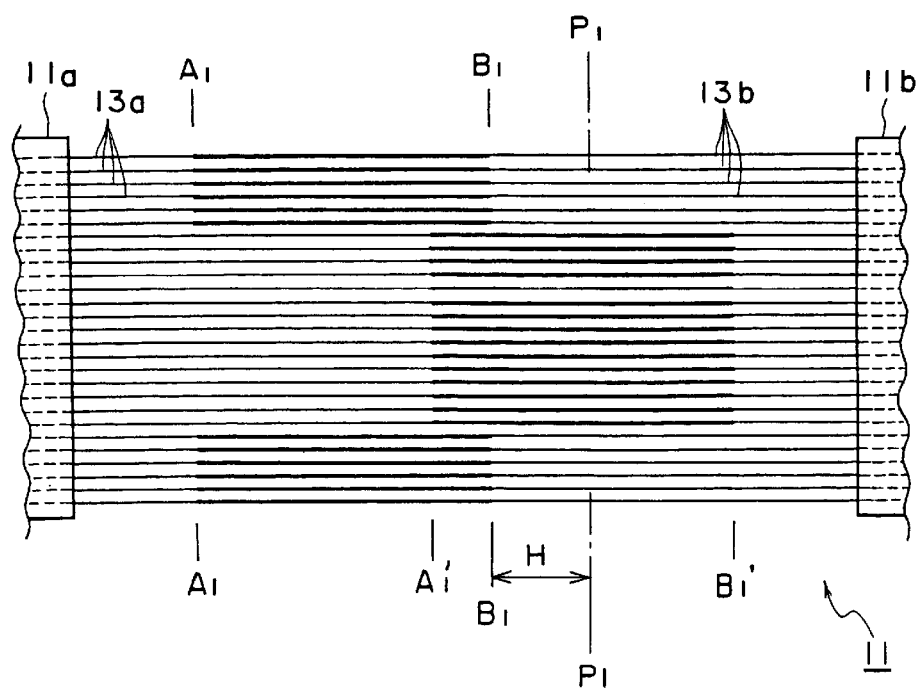
FIG. 8 is a plan view which shows a state in which each of the cord protruding portions shown in FIG. 7 and a corresponding cord protruding portion are made to overlap each other.

Subsequently, as shown in FIG. 8, each of cord protruding portions 13a at the one end 11a of the crawler body and a corresponding cord protruding portion 13b at the other end 11b of the crawler body are disposed so as to overlap each other. For the purpose of facilitating understanding, portions in which corresponding cord protruding portions overlap each other, are indicated exaggeratively by thick lines.

Due to the cord protruding portions 13a and 13b being entirely subjected to vulcanization processing (heating and filling unvulcanized rubber), a rubber crawler product having an integrally connected structure as shown in FIGS. 5 and 6 is completed.

A structural feature of the present embodiment is that, as shown in FIG. 7, the cord protruding portions 13a and 13b at the ends 11a and 11b of the crawler body are divided into groups such that each group has a protruding length different from those of other groups.

Specifically, when seen from a direction perpendicular to a belt surface, the cord protruding portions at the one end 11a of the crawler body has, as a whole, a convex configuration (a male configuration), and the cord protruding portions at the other end 11b of the crawler body has, as a whole, a concave configuration (a female configuration).

In other words, the lines which each connect ends of facing cord protruding portions at the ends of the crawler body are disposed so as to have one of terraced, tiered, and crenellated configurations.

As can be seen from FIG. 8 which shows the overlapping state, the cord overlapping portion includes outline (A1-A1'-A1) and outline (B1-B1'-B1).

The above-described outlines are separated from each other in a longitudinal direction of the belt (that is, a longitudinal direction of the crawler body). Each outline is comprised of a bent line, not one straight line.

Due to the above-described structural feature of the present embodiment, the difference in rigidity between a portion of the crawler body including the overlapping portion, and a portion thereof not including the overlapping portion becomes small as compared with the conventional rubber crawler 1. Namely, the portion of the crawler body including the overlapping portion is not so hard.

Accordingly, a problem of high noise or high vibration generated in the conventional rubber crawler is completely settled. It is considered that this is because the overlapping portion in which high rigidity may be caused, is partially offset (dispersed) in the longitudinal direction of the belt.

Further, the outline (A-A1'-A1) and the outline (B1-B1'-B1), which form the boundary between the high-rigidity portion and the nonrigid portion of the rubber crawler 11, are neither a straight line. Therefore, as compared with the conventional rubber crawler, bending of the rubber crawler 11 with the above-described outlines substantially as the center, is difficult to occur.

Referring again to FIGS. 6 and 8, a dimension H between position B1 and an intermediate position of position A1' and position B1' (which intermediate position is position P1) in the longitudinal direction of the belt is preferably 10 mm or greater, and more preferably 20 mm or greater. When the dimension H is less than 10 mm or 0 mm, buckling is apt to occur very often in an intermediate portion of the rubber crawler including the overlapping portion.

Figure 9:
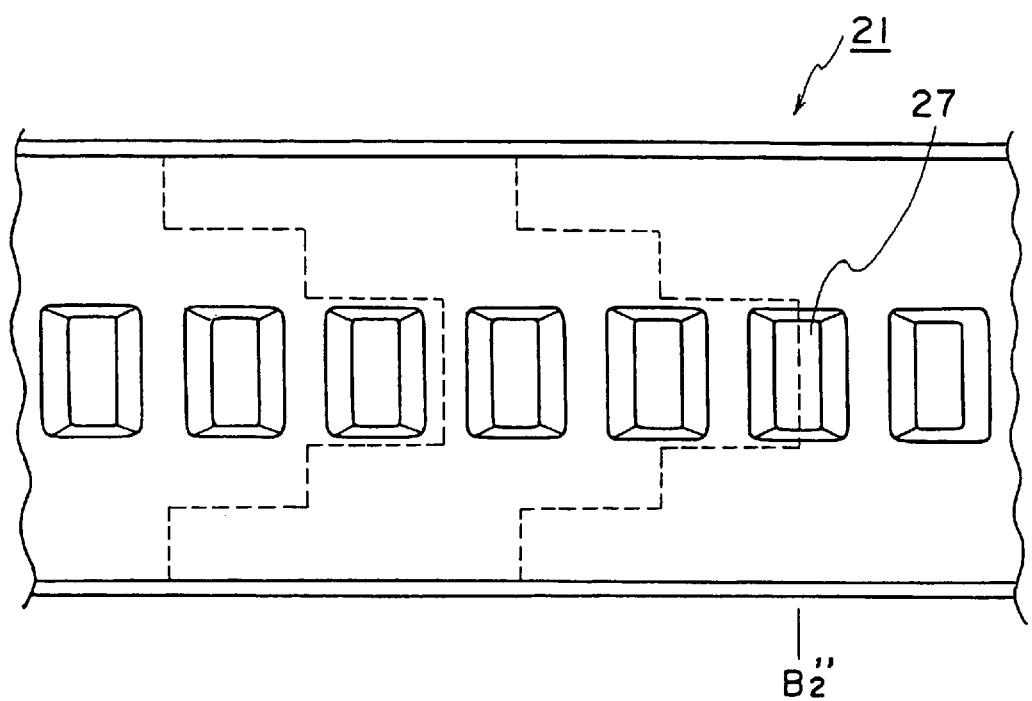
FIG. 9 is a plan view of a rubber crawler according to a second embodiment of the present invention.
Figure 10:
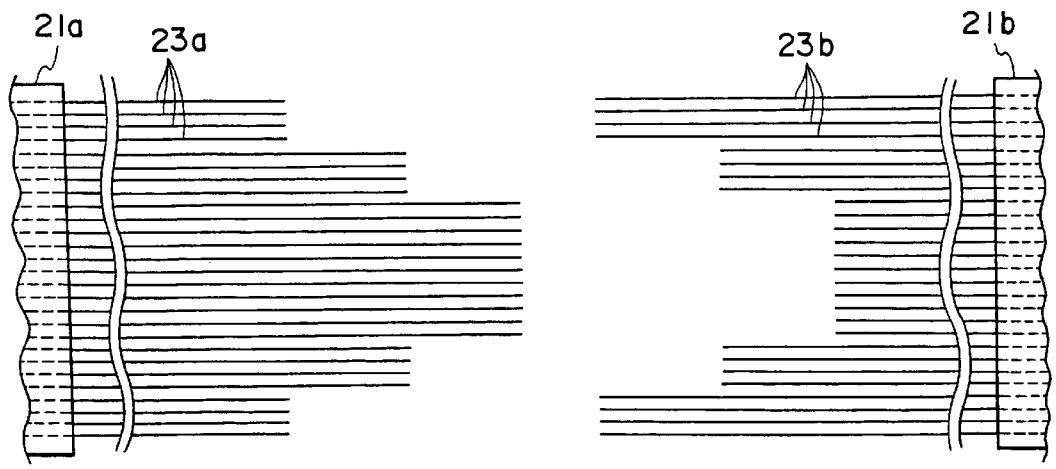
FIG. 10 is a plan view which shows cord protruding portions at each of ends of a crawler body in a connecting process of the rubber crawler shown in FIG. 9.

Next, a description will be given, with reference to FIGS. 9 to 11, of a rubber crawler 21 according to a second embodiment of the present invention, mainly, a portion in which the second embodiment differs from the first embodiment.

Figure 11:
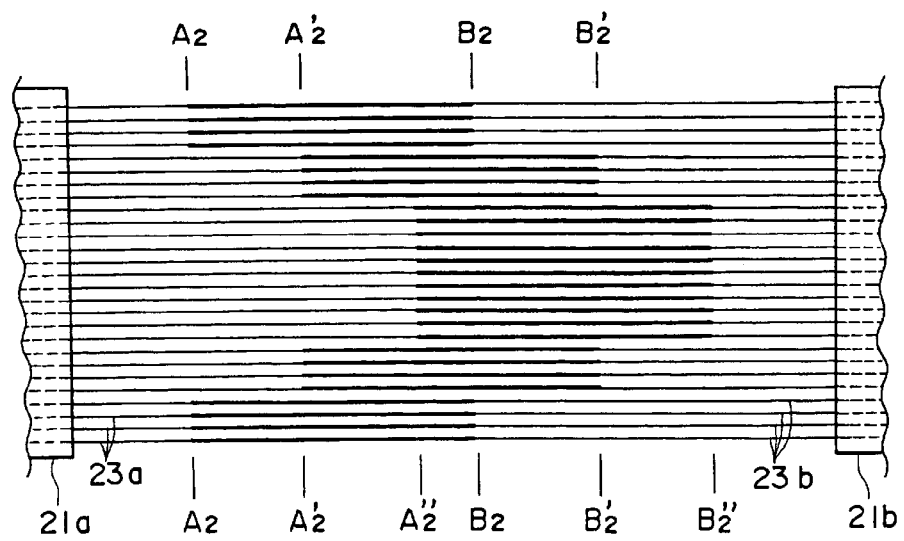
FIG. 11 is a plan view which shows a state in which each of the cord protruding portions shown in FIG. 10 and a corresponding cord protruding portion are made to overlap each other.

In the second embodiment, as can be seen from FIG. 11 which shows the overlapping state, a portion in which cord protruding portions 23a and 23b overlap each other, includes outline (A2-A2'-A2"-A2'-A2) and outline (B2-B2'-B2"-B2'-B2).

The above-described outlines are separated from each other in the longitudinal direction of the belt, and each outline is comprised of a bent line, not one straight line. In other words, the lines which each connect ends of facing cord protruding portions at ends 21a and 21b of the crawler body, are disposed so as to have one of terraced, tiered, and crenellated configurations.

Due to the above-described structural feature of the second embodiment, the same effect as that of the first embodiment, or more excellent effect can be obtained. That is, a portion of the crawler body including the overlapping portion does not become hard, and bending of the rubber crawler with the outlines substantially as the center is difficult to occur.

Referring again to FIG. 11, from the standpoint of preventing occurrence of buckling, it is preferable that the intermediate position between position A2" and position B2" in the longitudinal direction of the belt does not coincide with position B2 or position B2'.

In each of the first and second embodiments, when the rubber crawler is used, there is a risk of ends of cord protruding portions (at position B1' of FIG. 6 and position B" of FIG. 9) projecting out from the crawler body made of rubber. Accordingly, desirably, cords may be embedded into the crawler body so that the ends of cord protruding portions be located at positions in which the ends and the driving rubber protrusion 17 and 27 overlap each other. As a result, the above-described drawback can be avoided.

Further, any of the cord protruding portions at the ends of the crawler body may be positioned at the side of inner periphery (or outer periphery) of the rubber crawler.

Industrial Applicability

As described above, according to the present invention, the difference in rigidity between a connecting portion of the crawler body and a portion thereof not including the connecting portion can be lessened, and occurrence of bending or buckling in the connecting portion can be prevented. As a result, a rubber crawler having excellent durability and reliability can be provided.

What is claimed is:

1. A ring-shaped elastic endless crawler comprising an elongated belt-shaped elastic crawler body, and a plurality of cords disposed in array and embedded in the crawler body so as to extend in a longitudinal direction of the crawler body, in which each of cord protruding portions projecting out from one end of the crawler body and a corresponding cord protruding portion projecting out from the other end of the crawler body are made to overlap each other, and thereafter, are entirely subjected to vulcanization processing to thereby form an integrally connected structure, characterized in that cord protruding portions at each of the ends of the crawler body are divided into groups such that each group has a protruding length different from those of other groups.

2. The elastic endless crawler according to claim 1, wherein a length of protrusion of cords in a central group relative to a transverse direction of the crawler body at one end of the crawler body, is longer than that of cords in each of groups located at both sides of the central group, and a length of protrusion of cords in a central group relative to a transverse direction of the crawler body at the other end of the crawler body, is shorter than that of cords in each of groups located at both sides of the central group.

3. The elastic endless crawler according to claim 1, wherein a configuration of cord protruding portions at one end of the crawler body and a configuration of cord protruding portions at the other end of the crawler body are complementary to each other.

4. The elastic endless crawler according to claim 1, wherein a configuration of cord protruding portions at each of the ends of the crawler body is symmetrical relative to a longitudinal center line extending in the longitudinal direction of the belt at a transversely-central portion thereof.

5. The elastic endless crawler according to claim 1, wherein the crawler body comprises rubber.

6. The elastic endless crawler according to claim 1, wherein each of the cords comprises steel.

7. A ring-shaped elastic endless crawler comprising an elongated belt-shaped elastic crawler body, and a plurality of cords disposed in array and embedded in the crawler body so as to extend in a longitudinal direction of the crawler body, in which each of cord protruding portions projecting out from one end of the crawler body and a corresponding cord protruding portion projecting out from the other end of the crawler body are made to overlap each other, and thereafter, are entirely subjected to vulcanization processing to thereby form an integrally connected structure, characterized in that the entire cord protruding portions at the one end of the crawler body when seen from a direction perpendicular to a belt surface, are formed so as to present a male configuration; and the entire cord protruding portions at the other end of the crawler body are formed so as to present a female configuration.

8. The elastic endless crawler according to claim 7, wherein a configuration of cord protruding portions at one end of the crawler body and a configuration of cord protruding portions at the other end of the crawler body are complementary to each other.

9. The elastic endless crawler according to claim 7, wherein a configuration of cord protruding portions at each of the ends of the crawler body is symmetrical relative to a longitudinal center line extending in the longitudinal direction of the belt at a transversely-central portion thereof.

10. The elastic endless crawler according to claim 7, wherein the crawler body comprises rubber.

11. The elastic endless crawler according to claim 7, wherein each of the cords comprises steel.

12. A ring-shaped elastic endless crawler comprising an elongated belt-shaped elastic crawler body, and a plurality of cords disposed in array and embedded in the crawler body so as to extend in a longitudinal direction of the crawler body, in which each of cord protruding portions projecting out from one end of the crawler body and a corresponding cord protruding portion projecting out from the other end of the crawler body are made to overlap each other, and thereafter, are entirely subjected to vulcanization processing to thereby form an integrally connected structure, characterized in that lines each connecting ends of facing cord protruding portions at the ends of the crawler body are disposed so as to form a configuration that is one of terraced, tiered, and crenellated when seen from a direction perpendicular to a belt surface.

13. The elastic endless crawler according to claim 12, wherein a configuration of cord protruding portions at one end of the crawler body and a configuration of cord protruding portions at the other end of the crawler body are complementary to each other.

14. The elastic endless crawler according to claim 12, wherein a configuration of cord protruding portions at each of the ends of the crawler body is symmetrical relative to a longitudinal center line extending in the longitudinal direction of the belt at a transversely-central portion thereof.

15. The elastic endless crawler according to claim 12, wherein the crawler body comprises rubber.

16. The elastic endless crawler according to claim 12, wherein each of the cords comprises steel.

17. A ring-shaped elastic endless crawler comprising an elongated belt-shaped elastic crawler body, and a plurality of cords disposed in array and embedded in the crawler body so as to extend in a longitudinal direction of the crawler body, in which each of cord protruding portions projecting out from one end of the crawler body and a corresponding cord protruding portion projecting out from the other end of the crawler body are made to overlap each other, and thereafter, are entirely subjected to vulcanization processing to thereby form an integrally connected structure, characterized in that when seen from a direction perpendicular to a belt surface, a portion in which cord protruding portions overlap each other, includes two outlines separated from each other in a longitudinal direction of a belt, and each outline includes a bent line.

18. The elastic endless crawler according to claim 17, wherein the two outlines are each formed so as to have one of terraced, tiered, and crenellated configurations as seen from a direction perpendicular to a belt surface.

19. The elastic endless crawler according to claim 17, wherein the two outlines are complementary to each other.

20. The elastic endless crawler according to claim 17, wherein the two outlines are each symmetrical relative to a longitudinal center line extending in a transversely-central portion of the belt.

* * * * *